US00RE34501E

United States Patent [19]

Jean et al.

[11] E Patent Number: Re. 34,501

[45] Reissued Date of Patent: Jan. 11, 1994

[54] SENSOR AND METHOD FOR ULLAGE LEVEL AND FLOW DETECTION

[76] Inventors: Buford R. Jean, P.O. Box 800, Round Rock, Tex. 78660; Gary L. Warren, P.O. Box 800, Round Rock, Tex. 78680; Richard W. Newton; Billy V. Clark, both of P.O. Box 660634, Dallas, Tex. 75266

[21] Appl. No.: 707,742

[22] Filed: May 30, 1991

Related U.S. Patent Documents

Reissue of:

[64] Patent No.: 4,833,918
Issued: May 30, 1989
Appl. No.: 95,348
Filed: Sep. 14, 1987

U.S. Applications:

[63] Continuation-in-part of Ser. No. 911,157, Sep. 24, 1986, abandoned.

[51] Int. Cl.[5] ..... G01F 23/28; G01R 27/06

[52] U.S. Cl. ..... 73/290 V; 73/290 R

[58] Field of Search ..... 73/290 R, 290 B, 290 V, 861, 861.18, 861.25; 324/640, 644; 340/612, 618-621; 342/124; 367/908

[56] References Cited

U.S. PATENT DOCUMENTS

| | | | |
|---|---|---|---|
| 2,498,548 | 2/1950 | Howard | 324/79 R |
| 2,596,531 | 5/1952 | Clarke | 324/175 X |
| 2,798,197 | 7/1957 | Thurston | 324/648 |
| 3,572,119 | 3/1971 | Bak | 73/290 |
| 3,594,667 | 7/1971 | Mann | 333/98 |
| 3,786,330 | 1/1974 | Inoue et al. | 324/640 X |
| 3,818,333 | 6/1974 | Walker . | |
| 4,044,355 | 8/1977 | Edvardsson | 343/14 |
| 4,045,727 | 8/1977 | Yu et al. | 324/646 X |
| 4,055,252 | 10/1977 | Klamm et al. | 209/74 M |
| 4,107,993 | 8/1978 | Shuff et al. | 73/290 R |
| 4,144,517 | 3/1979 | Baumoel | 73/290 V X |
| 4,210,023 | 7/1980 | Sakamoto et al. | 73/290 R |
| 4,218,678 | 8/1980 | Fowler et al. | 343/5 |
| 4,238,795 | 12/1980 | Scheik et al. | 343/14 |
| 4,339,648 | 7/1982 | Jean | 219/10.55 |
| 4,359,902 | 11/1982 | Lawless | 73/290 |
| 4,375,057 | 2/1983 | Weise et al. | 187/134 |
| 4,425,793 | 1/1984 | Turton et al. | 73/290 R |
| 4,458,530 | 7/1984 | Bastida | 73/290 |
| 4,566,321 | 1/1986 | Zacchio | 73/58.5 |
| 4,588,966 | 5/1986 | Horn et al. | 331/96 |
| 4,588,967 | 5/1986 | Horn et al. | 331/107 G |
| 4,670,754 | 6/1987 | Zacchio | 342/124 |
| 4,765,705 | 8/1988 | Seymour et al. . | |

FOREIGN PATENT DOCUMENTS

| | | | |
|---|---|---|---|
| 0720970 | 11/1965 | Canada | 340/621 |
| 720970 | 11/1965 | Canada . | |
| 1016784 | 1/1966 | United Kingdom . | |

*Primary Examiner*—William A. Cuchlinski, Jr.
*Assistant Examiner*—W. Morris Worth
*Attorney, Agent, or Firm*—Alton Payne

[57] ABSTRACT

A device is provided for detecting the ullage level and flow in a vessel by detecting the presence of a solid or liquid material in proximity to a microwave detector. The device may be mounted to the side of the vessel or suspended inside the vessel so as to bring the microwave sensor into proximity with the surface of the contents of the vessel. A microwave bridge circuit may be used to detect a change in either the amplitude or phase of a signal reflected by the material within the vessel compared to a reference signal tuned to either the presence or absence of the anticipated solid or liquid material. In one embodiment, the reflected material signal is compared to the signal from a sample chamber containing the material to be detected. The device can reliably detect the level of multiple interfaces for various materials having distinct electric or magnetic properties.

30 Claims, 5 Drawing Sheets

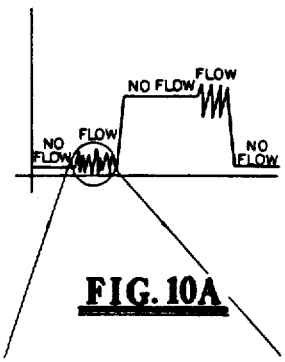
FIG. 10A
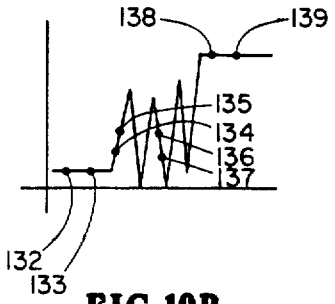
FIG. 10B
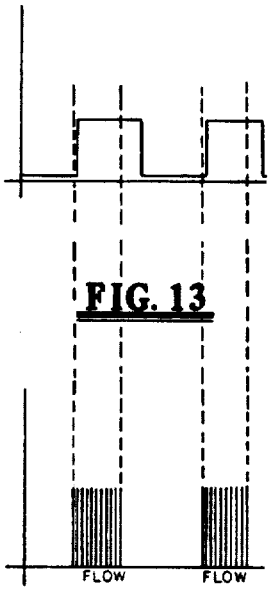
FIG. 13
FIG. 12
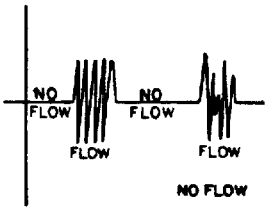
FIG. 11
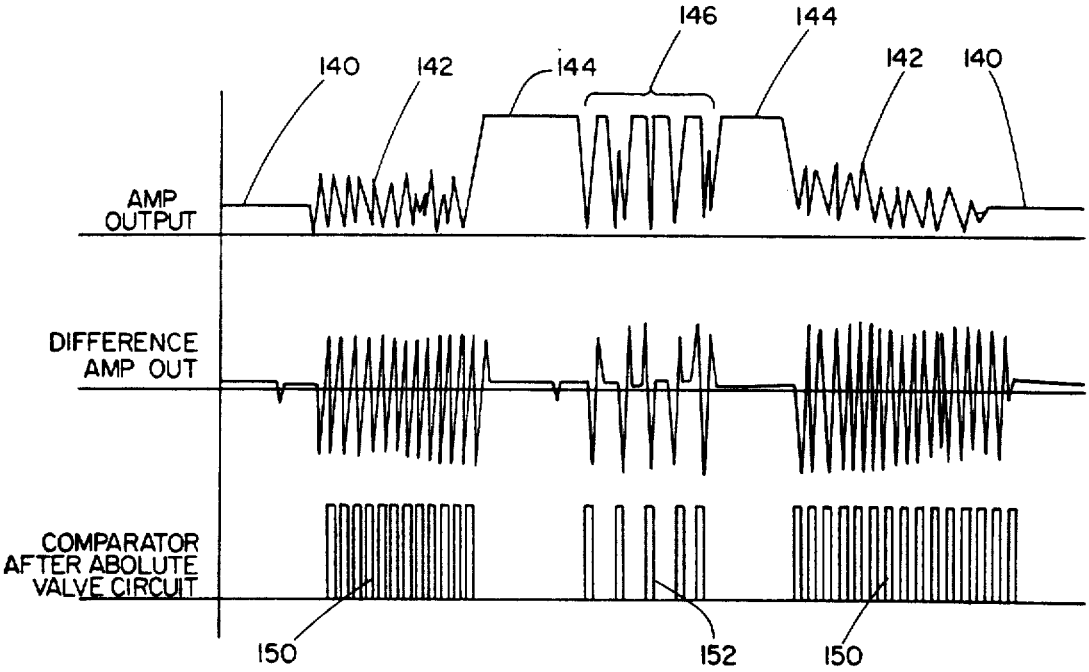
FIG. 14

SENSOR AND METHOD FOR ULLAGE LEVEL AND FLOW DETECTION

Matter enclosed in heavy brackets [ ] appears in the original patent but forms no part of this reissue specification; matter printed in italics indicates the additions made by reissue.

CROSS-REFERENCE TO RELATED APPLICATION

The present application is a continuation-in-part application of the application of Buford R. Jean, Richard W. Newton, Gary L. Warren and Billy V. Clark, U.S. Ser. No. 911,157, filed Sep. 24, 1986, entitled ULLAGE LEVEL SENSOR AND METHOD now abandoned.

FIELD OF THE INVENTION

The present invention relates to techniques for detecting when the contents of a tank or other vessel reach a certain level and, more particularly, to improved techniques for determining when that level is obtained utilizing microwave technology having significant advantages compared to conventional level detection techniques. Further, the present invention relates to detecting flow or no-flow through a conduit using the improved techniques.

BACKGROUND OF THE INVENTION

Various mechanical devices have long been used to determine when the level of material in a tank or other vessel reaches a certain point. Floats and displacers rely upon the buoyant forces of a liquid, while other devices use diaphragms or vibrating elements to sense the presence of a liquid or solid. Such mechanical devices generally have a high maintenance cost due to deterioration or binding of various mechanically moving parts.

Sensing devices which rely upon measuring the weight of the tank contents require precise knowledge of the specific gravity of the material in order to accurately determine the level of material in the vessel. Optical sensors generally require an extremely clean environment for reliable operation, while sonic devices do not function well in foam or dust environments. Finally, conductivity sensing devices cannot be reliably used for determining the level of many solids or liquids in a tank, such as dielectric materials, and capacitive devices generally are restricted to detecting the level of nonconductive materials.

Microwave sensors have a significant advantage over the devices described above in that such devices may be universally employed for detecting the level of almost any solid or liquid, regardless of its conductivity or specific gravity. Moreover, microwave sensors are generally insensitive to dust, vapors, foam layers, or viscous liquid coatings or thin layers of powder on the sides of the vessel.

U.S. Pat. No. 4,107,993 discloses microwave techniques for detecting the level of a liquid in a vessel. An external chamber constructed of material invisible to microwaves is required, and the system detects amounts of unabsorbed energy to the receiver. Microwave devices of this type experience alignment problems since the transmitter and receiver must be properly positioned with respect to one another.

U.S. Pat. Nos. 4,218,678, 4,359,902, and 4,044,355 also disclose microwave sensing devices for determining the level of materials in a tank. Microwave devices which utilize radar technology generally seek to determine the travel time of a signal to the detected material and thence to the receiver. The expense and complexity of these devices limits their practical use to situations in which the actual level of the material in the tank must be determined, as compared to devices which simply determine whether the material has or has not reached a certain level.

U.S. Pat. Nos. 3,572,119 and 4,458,530 are similarly directed to devices intended to quantitatively determine the level of liquid in a vessel. A sensor monitors the alteration of the standing wave passing through the liquid to determine the liquid level.

The disadvantages of the prior art are overcome by the present invention, and improved methods and apparatus are hereinafter described for inexpensively yet reliably determining whether a solid or liquid material in a container has obtained a certain level or if such material is flowing or not.

SUMMARY OF THE INVENTION

A propagating wave from a microwave oscillator is divided and transmitted horizontally through a measurement arm in parallel with a reference arm. The impedance presented to the propagating electromagnetic wave in the measurement arm is a function of the conductivity, permitivity, permeability of the material within the vessel opposite a dielectric window at the end of the measurement arm. A change in the presence of or type of the material will thus produce a change in the amplitude and phase of the reflected wave due to the impedance change seen by the microwave signal at the boundary layer. The divided propagating wave in the reference arm may be altered by resistive and reactive tuning elements, or by boundary layer impedance when that wave engages a selected material in a sample chamber.

The reflected measurement and reference waves return to the microwave bridge circuit and a differential signal indicative of their difference in magnitude and/or phase is detected by the microwave detector. The signal output from the bridge circuit may thus be proportional to the difference between the reflection coefficient seen by the divided waves in the measurement arm and the reference arm. The reference arm may be tuned to present to the bridge circuit an impedance equal to the impedance normally seen by the measurement arm, thereby increasing the sensitivity of the sensor. This output is fed to suitable electronics for amplifying and comparing that output to a trip point, thereby causing the energization of a suitable relay or other appropriate device for the actuating of an alarm, pump, or other component.

A significant advantage of the present invention relates to its high reliability and reduced maintenance costs, since the system does not utilize moving parts which may wear or bind. If the tank is made from a metallic material, only a single dielectric window transparent to microwaves need be provided, and thus there are no alignment problems between sensors and receivers. If the tank is manufactured from a dielectric material, e.g., fiberglass, no openings in the tank are necessary, thereby substantially reducing installation costs.

The techniques of the present invention achieve a highly reliable yet inexpensive determination of whether the level of a liquid or solid in a tank has reached a given point. The same sensor will work for virtually any material having an impedance different than the electric and magnetic properties of air. Also, techniques of the present invention can be easily utilized to detect the level of an interface between two materials which have different electrical or magnetic properties, and therefore present different impedence values to the propagating wave. As an example, the device of the present invention can easily detect whether the interface between oil and water has reached the level of the detector. The methods and apparatus herein described offer increased reliability, sensitivity, and universal application compared to prior art level sensing switches, and at a cost substantially less than prior art microwave ullage sensors which provide an output indicative of the quantitative level of material in a tank.

An alternative embodiment of the present invention provides a method and apparatus for detecting whether solid material is flowing or not flowing through a conduit. The operation of the flow/no-flow concept of the present invention utilizes the changes in output from a microwave bridge circuit that are induced by changes in the reflection coefficient associated with the impact of the waves on the specific material under investigation. Generally, the method of the present invention for determining the flow or no-flow of materials in a conduit or container comprise generating a wave, separating the wave into a measurement wave and a standard wave, injecting the measurement wave into the conduit for impacting the available material and returning the reflected measured wave indicative of the reflection coefficient at the point of impact, altering the standard wave for producing a reflected standard wave having an amplitude and phase corresponding to an amplitude and phase associated with the measurement wave, combining the reflected measurement wave with the reflected standard wave for either constructively enhancing or destructively reducing the combined waveform for generating a combined wave, generating a bipolar signal from the combined wave, generating a unipolar signal from the bipolar signal, and generating a drive signal based upon the frequency of the unipolar signal for discriminating between conditions of flow and no-flow as characteristic of the material being evaluated.

The sensitivity of the present invention for determining the flow or no-flow of material in a conduit is readily adjustable. The present invention can be adjusted for discriminating against random pellets dropping past the detector as well as the movement of material past the detector and completely engulfing the conduit.

These and other features and advantages of the present invention will become apparent from the detail description, wherein reference is made to the figures in the accompanying drawings.

FIGS. 10A and 10B illustrate a typical signal from the input amplifier associated with the present invention.

FIG. 11 illustrates a typical bipolar signal associated with the present invention.

FIG. 12 illustrates a typical unipolar signal associated with the present invention.

FIG. 13 illustrates a typical relay drive output signal associated with the present invention.

FIG. 14 is a multisequence illustration of signals generated in association with the present invention when used for determining flow/no-flow characteristics within a conduit.

The above general description and the following detailed description are merely illustrative of the generic invention, and additional modes, advantages and particulars of this invention will be readily suggested to those skilled in the art by the following description.

DETAILED DESCRIPTION OF PREFERRED EMBODIMENTS

Figure 1:
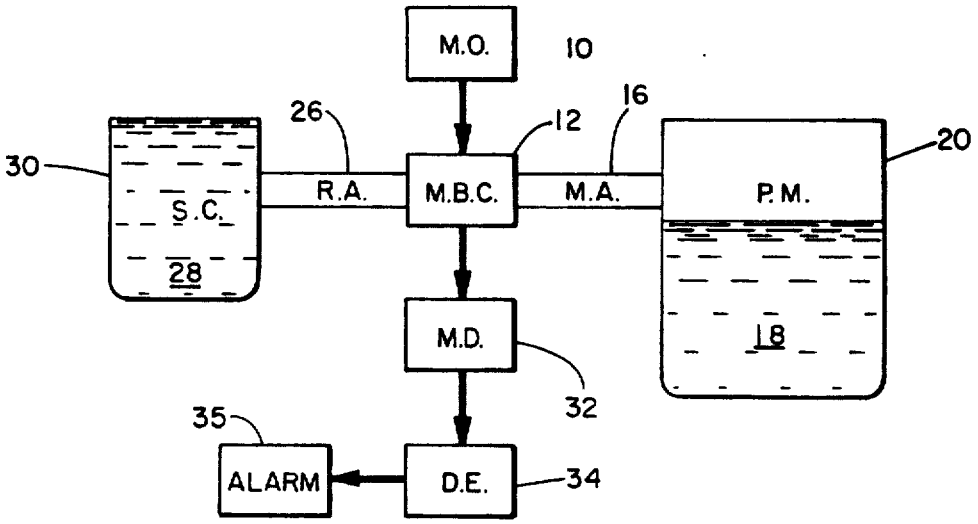
FIG. 1 is a simplified function block diagram of the microwave level detector according to the present invention.

The concept of the present invention is broadly illustrated in block diagram form in FIG. 1, and includes a microwave oscillator 10 for generating a constant frequency propagating wave, a microwave bridge circuit 12, a microwave detector 32, decision electronics 34, and a device controlled by the decision electronics, such as alarm 35. The microwave bridge circuit 12 serves to (a) functionally divide the propagating wave into two parallel waves, (b) receive two reflected waves, and (c) output a reflected differential wave to the detector 32.

One of the divided propagating waves travels down the measurement arm 16 to the tank, vessel, or container 20 containing a propagation medium. Depending on the level of the fluid or solid 18 in the tank 20, the propagating medium seen by the wave in the measurement arm 16 may, in its simplest form, be either air (perhaps with some tank vapors, dust or foam) or fluid 18. The measurement arm reflected wave to the microwave bridge circuit 12 will be altered in amplitude or phase by the impedance of the boundary layer (point of discontinuity) at the end of the measurement arm, and that impedance will depend on the presence or absence of material 18 in the tank 20 at the level of the measurement arm 16.

The other divided propagating wave travels down the reference arm 26 and, in the embodiment shown in FIG. 1, is altered by the impedance of the boundary layer at the end of the reference arm 26 presented by the sample chamber material 28 housed in the container 30.

The container 30 is filled with a selected material, preferably identical to the material 18 in the tank 20. The reflected reference arm signal will thus be sufficiently different than the reflected measurement arm signal unless the level of the material 18 in the tank 20 covers-/encompasses the cross-sectional area of the measurement arm 16 through which the radiation passes. Accordingly, decision electronics may be provided to either actuate the alarm 35 is there is a sufficient reflected differential signal to the detector 32 (when the level of fluid in the tank 20 falls below the level of the reference arm), or alternatively, when there is not a sufficient reflected differential signal (when the fluid level rises to or above the level of the reference arm). In either case, the technique of the present invention easily, reliably, and inexpensively enables the detection of whether the material level in tank 20 is at or below a certain level, i.e., the level of the reference arm. Moreover, this detection is made without the need for any sensing element to physically contact the material in the tank, and can be made almost irrespective of the type of solid or liquid material in the tank.

The device described above operates on the principle that the impedance presented to a propagating microwave depends upon the electric and magnetic properties of the boundary layer material through which the wave passes. When the wave reaches the boundary layer, at least some of the wave will be reflected, and the amplitude and phase of the reflected wave will thus be functionally related to the boundary layer material, i.e., the material in the tank. Since some factors affect the impedance seen by a wave due to any change in the material at the boundary layer, including the material conductivity, its permitivity, and its permeability, the device of the present invention is ideally suited to be a universal level detector without significant regard to the type of material being detected. A change in the amplitude and phase of the reflected wave will thus occur in almost every instance with a change in the material at the boundary layer. In its simplest form, that change is from air (or vapors, dust, or foam) to a liquid or solid material. It should be understood, however, that the present invention is also well suited to determine a change from one liquid or solid material to another liquid or solid material. The device of the present invention may thus be used to detect a rising or falling interface of liquids, such as an oil/water interface.

Figure 2:
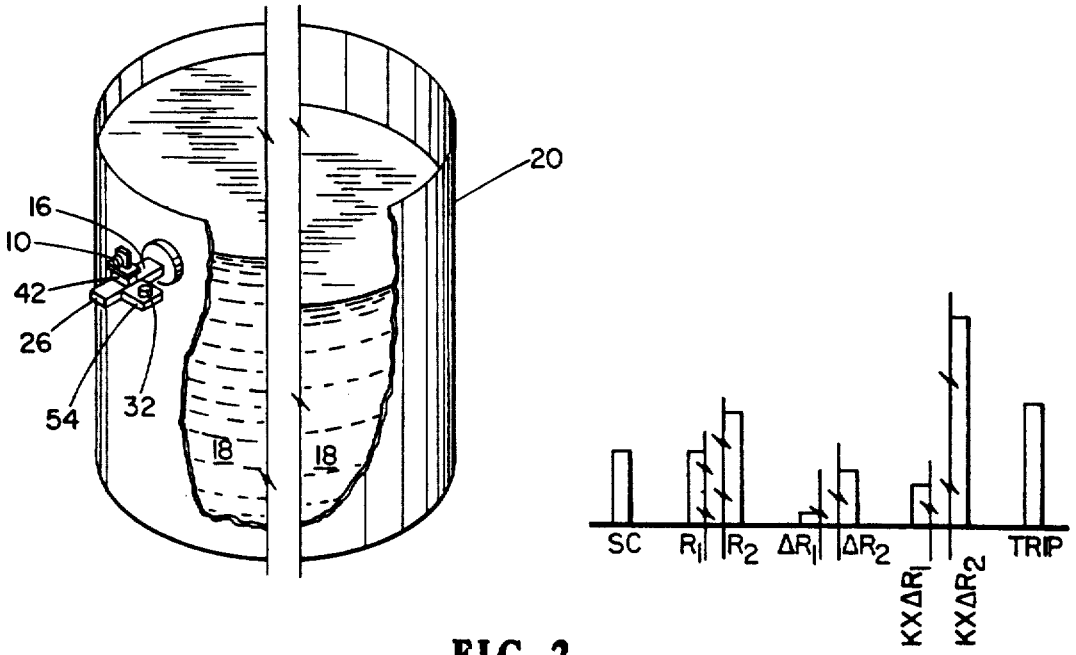
FIG. 2 is a simplified pictorial illustration of the detector according to the present invention mounted on a tank, along with representative outputs of signal magnitudes depending on whether the level of material in the tank has reached the level of the sensor.

FIG. 2 depicts a simplified pictorial illustration of the present invention along with representative outputs of signal magnitudes depending on whether the level of material has reached the level of the detector. Microwave oscillator 10 generates and transmits an incident propagating microwave down the waveguide section 42, which wave is divided as explained above by the microwave bridge circuit into two waves travelling down respective waveguide sections or arms 16 and 26. The reflected differential signal travels down the waveguide 54, and is detected by the detector 32.

The material in the sample chamber 30 (FIG. 1) may correspond to the material 18 in the tank. The sample quantity preferably is sufficiently large so as to appear to be an infinite quantity to the reference wave, and thus the value of the reflected signal to the bridge circuit from the sample chamber, SC, will be substantially constant. The magnitude of the reflected signal to the microwave bridge circuit from the measurement arm 16 will, however, depend on the level of fluid in the tank 18. $R_1$ indicates the magnitude of the reflected reference arm signal when the material level is above the level of the measurement arm 16, and $R_2$ indicates the magnitude of the reflected measurement arm signal when the material level is below the level of the reference arm 16.

Accordingly, the difference between the reflected reference arm and the measurement arm signals, which difference is the magnitude of the signal transmitted to the detector 32, is represented in FIG. 2 by the designations $\Delta R_1$ and $\Delta R_2$. The difference may be amplified by standard techniques within the decision electronics to produce the sizable difference in the signals $KX\Delta R_1$ and $KX\Delta R_2$. Comparison may thus easily be made between the respective $KX\Delta R_1$ signal and the selected trip value, and the output used to either actuate or not actuate the control device, such as alarm 35.

According to the embodiment as shown in FIGS. 1 and 2, the device of the present invention may thus be "tuned" or calibrated by placing in the sample chamber the same material whose presence or absence is being detected by the reflected reference arm signal. The embodiment as shown in FIGS. 1 and 2 is thus virtually insensitive to the effects of temperature and pressure variations in the material, since the divided propagating waves will be each identically affected. Moreover, the device as described herein is substantially insensitive to variations in signal power or frequency from the oscillator 10, and thus requires no external tuning.

Figure 3:
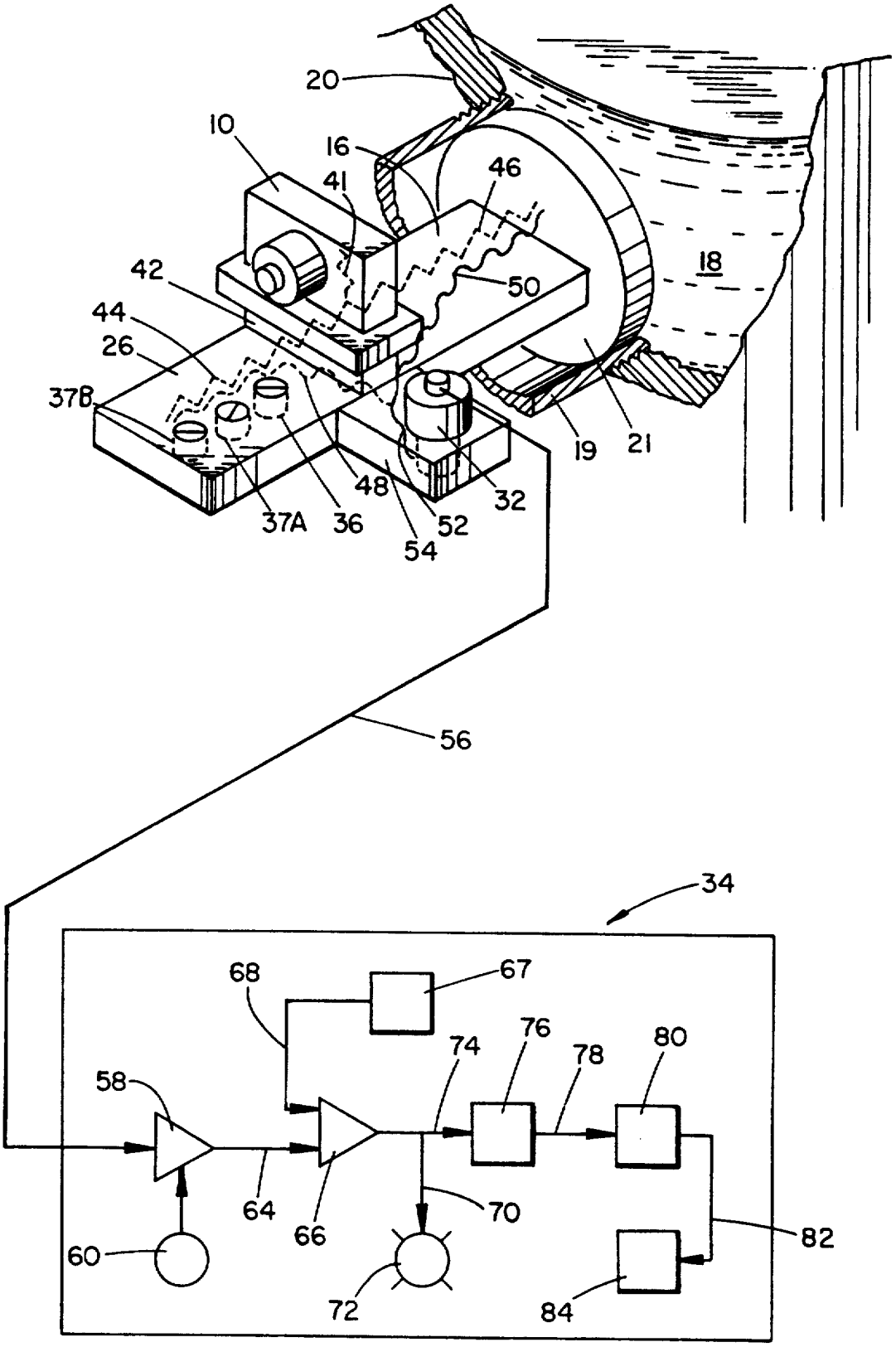
FIG. 3 is a pictorial illustration of one embodiment of the present invention mounted in association with a suitable tank, and also depicting in block form the decision electronics generally referenced in FIG. 1.

FIG. 3 depicts an alternate embodiment of the present invention, wherein the microwave oscillator 10 is a Model GOS 2570 Gunn diode cavity-type oscillator, commercially sold by Alpha Industries. This oscillator generates a microwave having a constant frequency of approximately 10.5 gigahertz. The frequency of the oscillating microwave according to the present invention is in the range of from 1 to 20 gigahertz, and preferably from 3 to 15 gigahertz, in order to maximize the clarity of the reflected measurement arm signal yet minimize the likelihood that a thin film or powder layer seen by the measurement arm wave will be improperly interpreted as a material level higher than the measurement arm.

The propagated microwave 41 from the oscillator 10 is injected by a waveguide 42 to the bridge circuit. Each of the waveguides 42, 16, 26 and 54 are rectangular in cross-sectional configuration, e.g., 0.4 inches by 0.9 inches. For the embodiment shown in FIGS. 1 and 2, the measurement arm 16 and the reference arm 26 preferably are the same length. These wave-guides may be fabricated from WR 90 bronze waveguide commercially available from A. T. Wall.

The microwave 41 is equally divided by a conventional hybrid or magic Tee within the bridge circuit, which causes propagated waves to travel horizontally down arms 16 and 26. The waveguides 16 and 26 are axially aligned, while the axis of waveguides 42 and 45 are perpendicular thereto. At the end of the measurement arm 16 is a dielectric window 21, which may be fabricated from various plastic or glass materials, such as Ryton, and is transparent to microwaves at the frequency level described above. The window 21 is sealingly positioned within nipple 19, which in turn is affixed to the tank wall 20 containing fluid or solid material 18. Thus, a maximum of one window in a vessel will be necessary according to the present invention. Moreover, if the tank material itself is substantially transparent to microwaves, e.g. fiberglass, the end of the waveguide 16 may be positioned against the exterior of the tank wall, and no special window is necessary in the tank wall.

As previously described, a portion of the propagating wave 46 will be reflected by the boundary layer at the interior surface of the window 21. The amplitude and frequency of the reflected wave will be significantly altered, however, by the impedance of that material on the microwave. Since air (or vapor, dust or foam) represent a significantly different impedance value to a microwave than does a liquid or solid material, the reflected measurement arm signal 50 will be significantly altered by the presence or absence of material 18 at the level of the measurement arm.

In the embodiment shown in FIG. 3, the divided microwave 44 travels down reference arm 26, and is altered by tuning elements 37B, 37A and 36. These tuning elements may be adjusted so that the reflected reference arm wave 48 corresponds in amplitude and phase to the reflected measurement arm wave 50, so that the bridge circuit 12 is balanced and the reflected differential signal 52 is nil or zero. Once the bridge circuit is balanced, the differential signal 52 will remain near zero even if the frequency of the propagating wave from the oscillator 10 drifts slightly in response to uncontrolled stimuli.

Preferably both resistive and capacitive tuning elements are provided for altering the reflected signal 48 from the reference arm to correspond to the reflected signal 50 from the measurement arm. Resistant tuning element 36 functions to absorb a regulatable quantity of microwave energy by adjusting its depth with respect to reference arm 26, and thereby primarily controls the amplitude of the reflected reference arm signal 48 to correspond to the amplitude of the reflected measurement arm signal 50. Two capacitive tuning elements 37A and 37B may also be regulated to primarily control the phase of the reflected reference arm signal 48. Each of the tuning elements are provided a fixed distance, e.g., ¼ wavelength apart, for maximizing their overall control capability. In the embodiment shown in FIG. 3, the elements 37A, 37B and 36 are placed ¼ wavelength, ½ wavelength, and ¾ wavelength from the end of the waveguide 26. The placement of the tuning elements 37A, 37B, and 36 provides the full range of tuning capability with the fewest number of components. Each of these tuning elements is commercially available from Johanson Manufacturing Corp. under Part Nos. 6927-0 and 6952-0, respectively.

The reflected differential signal 52 travels down waveguide 54 and is detected by microwave detector 32. A suitable detector 32 is available from Microwave Associates under Model MA40042. The direct current output from detector 32 is thus proportional to the magnitude of the amplitude and phase of the reflected differential signal, and this output is connected via 56 to the decision electronics 34.

The decision electronics 34 can be adjusted to establish a detector output threshold for switching action to controlled apparatus, such as alarm 35. The signal from the detector 32 is fed to the amplifier 58, which may be adjusted by an external selectivity adjustment 60 to alter the multiple constant K. The amplified output 64 is thus input to comparator 66, and is compared to a switching threshold value which may either be input manually or fed by the computer 67 to the comparator 66 via line 68. The output from the computer 67 thus presents an adjustable threshold which permits control of the degree of mismatch that must be observed before a switching action is achieved. If the desired mismatch value is exceeded, light 72 may be actuated via line 70.

The output from comparator 66 is preferably connected via 74 to time delay 76, which enables adjustment of the time period necessary for the necessary mismatch from comparator 66 to be present before a switching action is obtained. Thus, the output 78 from the time delay 76 presents a switching action signal only if the desired threshold magnitude if observed for a selected period of time. This time adjustment feature is particularly useful for eliminating false switching actions that could otherwise be generated by the sloshing of agitated liquids within the tank 20. Finally, conventional failsafe electronic circuit 80 may be provided so that the relay 84 is responsive not only to the output from the comparator 80, but also the presence or absence of power to the circuitry. As previously indicated, the relay 84 may be used to control various equipment, such as lights, alarms, pumps, indicators, or other control devices.

It should be understood that the sensitivity of the present invention is substantially increased by providing a microwave bridge circuit which produces an output directly indicative of the difference, in either amplitude or phase, or both, between the reflected reference arm signal and the reflected measurement arm signal. Under either of the embodiments described herein, the reflected reference arm signal may be tuned so as to present an impedance equal to the impedance normally seen in the reflected measurement arm signal. While the microwave detector 32 particularly depicted herein has been primarily described as providing a D.C. output whose amplitude is indicative of both an amplitude or phase difference in the two reflected signals, it should be understood that detector circuits are available while sense only an amplitude imbalance or a phase imbalance in the microwave bridge signals. Thus, it is within the spirit and scope of the present invention to provide a microwave detector circuit which can distinguish between an amplitude and a phase differential signal, and appropriate modifications would be made to the decisions electronics described herein, as those skilled in the art readily appreciate.

Figure 4A:
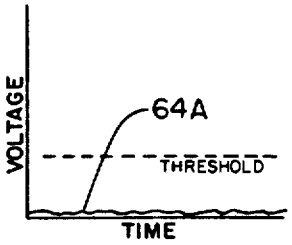
FIGS. 4A and 4B illustrate a typical signal from the amplifier of the present invention concerning the detector being near null and away from null, respectively.
Figure 5A:
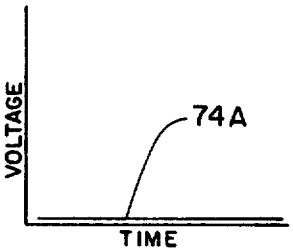
FIGS. 5A and 5B illustrate the resultant signal generally referenced in FIGS. 4A and 4B, respectively, after modification.
Figure 4B:
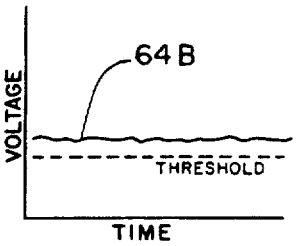
Figure 5B:
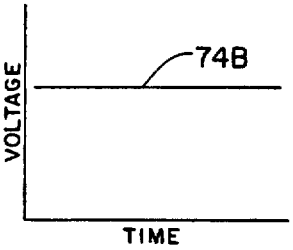

FIGS. 4A and 4B illustrate typical signals 64A and 64B from the amplifier 58. Specifically, the signal 64A illustrates the differential signal 52 when the detector is near null. Conversely, signal 64B illustrates the signal from the amplifier 58 when the detector is away from null and constructive interference experienced by the differential signal 52. FIGS. 5A and 5B illustrate the resultant signal after modification of the signals illustrated in FIGS. 4A and 4B. Signal 74A corresponds to signal 64A after passing through the comparator 66. Similarly, signal 74B corresponds to signal 64B after passing through the comparator 66.

Figure 6A:
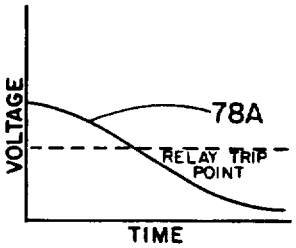
FIGS. 6A and 6B illustrate the integration of the signals generally referenced in FIGS. 5A and 5B, respectively.
Figure 6B:
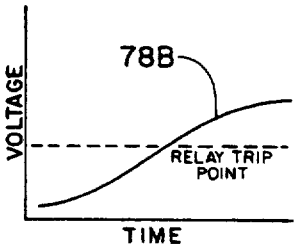

FIGS. 6A and 6B illustrate the effect of integration on the comparator output signal as illustrated in FIGS. 5A and 5B. FIG. 6A illustrates the output from the time delay 76 when the comparator output is low, e.g., signal 74A. Similarly, FIG. 6B illustrates the effect on signal 78B when the comparator output is high. FIGS. 6A and 6B illustrate that a relay trip point can be adjusted at a specific voltage. When the signals 78A and 78B pass above or below the specified relay trip voltage, the relay is activated or deactivated.

Figure 7:
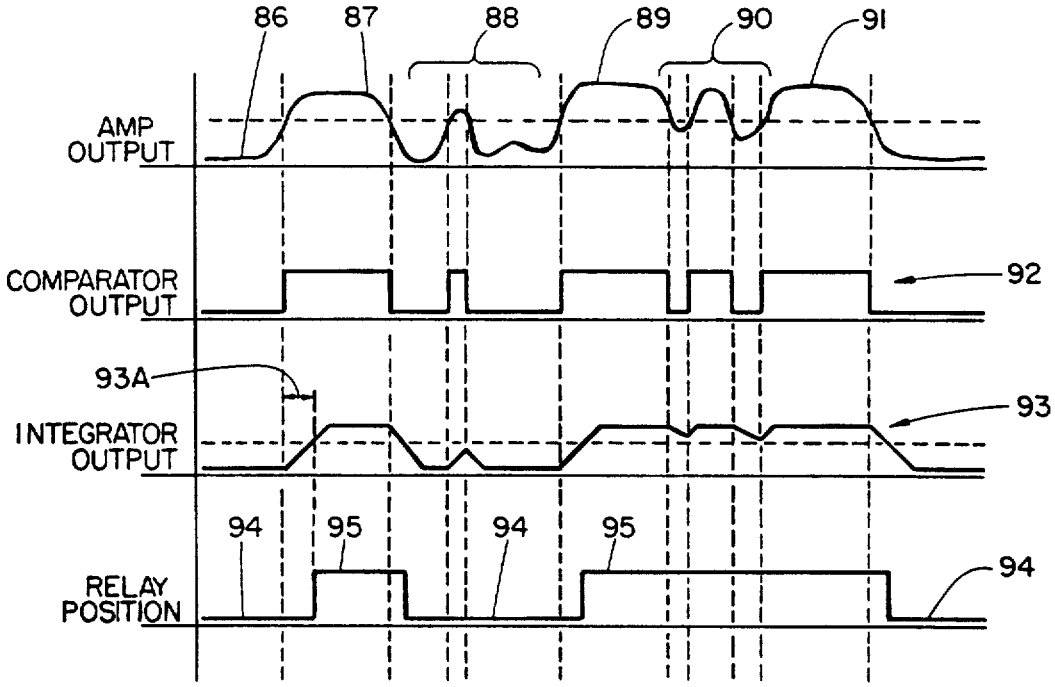
FIG. 7 is a multisequence illustration of signals generated when the present invention is used for ullage measurements.

FIG. 7 is a multisequence illustration of the signals generated by the present invention when used for ullage measurement. The amplifier output 64 is illustrated at the top of FIG. 7. The amplifier output 64 passes through a sequence of changes as follows: a null signal 86, a non-null signal 87, a null signal with a splash 88, a non-null signal 89, a splash signal 90, and a non-null signal 91. The corresponding output from the comparator is illustrated in FIG. 7 as signal 92. When the signal from the time delay 76 is applied to the signal 92, the resultant integrator output signal 93 is created. The time delay between recognition and relay tripping is adjustable as illustrated by the spacing 93A. The activation or deactivation of the relay is illustrated in the bottom portion of FIG. 7. An open relay is represented by numeral 94 and a closed relay is represented by numeral 95.

Figure 8:
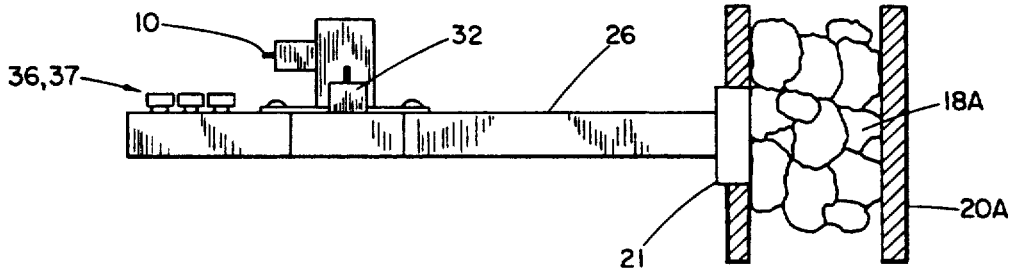
FIG. 8 is a pictorial illustration of another embodiment of the present invention mounted on a suitable conduit.

FIG. 8 illustrates another embodiment of the present invention utilized to measure the flow/no-flow characteristics of material in a conduit. FIG. 8 illustrates granular material 18A passing through conduit 20A. The oscillator 10 is associated with the conduit 20A by the window 21. The detector 32 is illustrated associated with the waveguide 26 and tuning elements 36 and 37. FIG. 8 is similar to the embodiment illustrated in FIG. 3 for measuring ullage.

Figure 9:
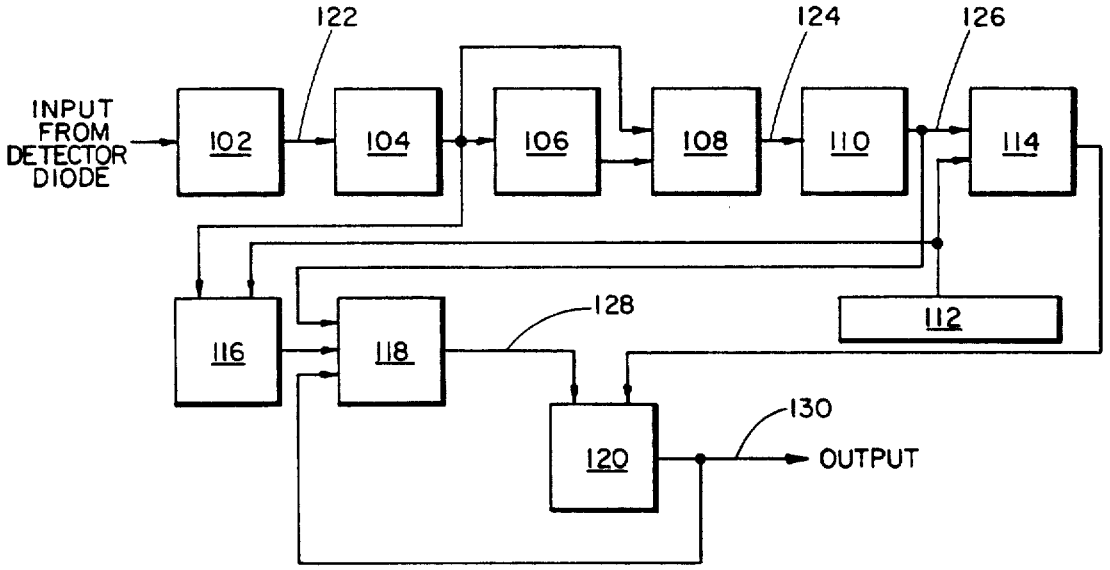
FIG. 9 illustrates a block diagram of decision electronics generally referenced in FIG. 8.

FIG. 9 illustrates a block diagram of a preferred form of the decision electronics as used in conjunction with the apparatus of the present invention illustrated in FIG. 8. FIG. 9 includes the input amp 102, the sample/-hold circuit 104, the low pass filter 106, the differential amplifier 108, the full wave rectifier 110, the voltage reference 112, the voltage comparator 114, the sum/invert circuit 116, the sum/integrate circuit 118 and the output control/timer 120. The operation of the flow/-no-flow detector of the present invention depends upon observing the changes in the output signal of the microwave bridge circuit that are induced by very slight changes in the reflection coefficient associated with the interface of the material. The signal from the detector 32 is input to the amplifier 102. The signal 122 passes from the amplifier 102 into the sample/hold circuit 104. The sample/hold circuit 104 is used to sample the output pulse and to hold this voltage constant until the next pulse is observed. If there are no changes in the pulse-to-pulse signal level, the output of the sample/hold circuit 104 will not vary.

After the sample/hold circuit 104, it is the objective of the present invention to detect very slight changes in signal amplitude. Although there are many circuits available for detecting a change in the amplitude of a signal, the presently preferred circuit utilizes the low pass filter 106 and the differential amplifier 108. The signal received from the sample/hold circuit 104 is divided into two channels, one of which is filtered or equivalently delayed by the low pass filter 106 and a second channel which is unfiltered. A differential amplifier 108 operates on the filtered and unfiltered signals to produce a bipolar output signal 124 that represents the difference between an instantaneous value of the output signal and its near term smoothed or delayed value. The resultant bipolar signal 124 is rectified by the full wave rectifier 110. The output 126 of the full wave rectifier 110 is input into the voltage comparator 114 in conjunction with the voltage reference 112. A primary control signal is output from the voltage comparator 114 and is utilized in conjunction with the sum/invert circuit 116 and the sum/integrate circuit 118 which acts generally as an analog threshold computer to create the integrator output 128. The integrator output 128 is the output from the sum/integrate circuit 118. The output control/timer 120 *responsive to the intergrator output 128 and the primary control signal* provides the output to drive a relay or the like.

FIGS. 10A and 10B illustrate a typical signal from the input amplifier 102 for better describing one aspect of the present invention. FIG. 10A illustrates the general signal 122 output from the amplifier 102. As readily indicated on FIG. 10A, the flow of material is represented by fluctuations in the signal 122. When no material is flowing, the signal 122 is quiet. FIG. 10B is an exploded view of a portion of FIG. 10A. As noted on FIG. 10B, there are instantaneous points 132 through 139. The circuit of the present invention takes a difference between the present output of the amplifier 102 and substracts it from a delayed or filtered version of the output of the amplifier 102. Thus, the circuit of the present invention substracts a delayed version of the signal from itself, e.g., in FIG. 10B, point 132 is substracted from point 133, point 134 is substracted from point 135, point 136 is substracted from point 137, and point 138 is substracted from point 139. It should be noted that it is not the signal level that is important but rather whether or not the signal changes in amplitude with respect to time. Thus, any signal that is constant with respect to time, i.e., flat, will give a zero output regardless of its magnitude. Any signal 122 that is changing with respect to time will give a positive or a negative signal depending on whether the input is going up or down.

FIG. 11 illustrates a typical bipolar signal from the differential amplifier 108 associated with the present invention. Specifically, FIG. 11 illustrates the differences as referred to in FIG. 10B. The flow characteristics associated with the signal are noted on FIG. 11. When the flow of material is present in the conduit 20A, the signal 124 fluctuates. When there is no flow in the conduit 20A, the signal 124 is steady.

FIG. 12 illustrates a typical unipolar signal associated with the present invention. The bipolar signals associated with FIG. 11 are passed through a full wave rectifier 110 so that the resultant signal 126 is the absolute value of the signals 124 illustrated in FIG. 11. FIG. 13 illustrates a typical relay drive output signal 130 which is illustrated in conjunction with the unipolar signals of FIG. 12.

FIG. 14 illustrates a multisequence illustration of the signals generated by the present invention when used for flow/no-flow detection within a conduit. The uppermost portion of FIG. 14 illustrates the output signal 122 from the amplifier 102. Specifically, numeral 140 illustrates a no-flow/null material state. The numeral 142 illustrates a flow/null material state. The numeral 144 illustrates a no-flow/non-null material state. The numeral 146 represents a state where random pellets are dropping past the window 121. The amplifier signals 122 are converted by the differential amplifier 108 to yield the output illustrated in the middle of FIG. 14. It should be noted that the difference amp output in FIG. 14 illustrates the same output as illustrated thereabove as the bipolar signal 124. The lower most portion of FIG. 14 illustrates the unipolar signal 126 as generated after the full wave rectifier 110 [and operated on by the sum/invert circuit 116 and sum/integrate circuit 118 to form an integrator output 128]. The sequence of pulses represented by numeral 150 illustrate pulses which cause the relay to trip. The sequence of pulses referenced by numeral 152 can be adjusted to be treated as a "flow condition" or a "no-flow condition" depending on the particular system being used.

Although the invention has been described in terms of the specified embodiments which are set forth in detail, it should be understood that this is by illustration only and that the invention is not necessary limited thereto, since alternative embodiments and operating techniques will become apparent to those skilled in the art in view of the disclosure. Accordingly, modifications are contemplated which can be made without departing from the spirit of the described invention.

What is claimed is:

1. A sensor for detecting the movement characteristics of material in a container or conduit, comprising:

microwave oscillator means for generating a constant propagated microwave in a frequency range of from 1 to 20 gigahertz;

microwave bridge circuit means for dividing microwave into a measurement microwave and a reference microwave;

first guide means for injecting the measurement microwave through a portion of the container substantially transparent to the propagated microwave frequency and for returning a reflected measurement microwave to the microwave bridge circuit means indicative of the reflection coefficient at the boundary layer of the transparent portion, the coefficient being significantly altered by one of the presence, the absence and the movement of the material at the level of the first guide means;

second guide means for transmitting the reference wave from the microwave bridge circuit means and for returning a reflected reference wave to the microwave bridge circuit means;

reference wave altering means for altering the reflected reference wave to correspond in amplitude and phase to the reflected measurement microwave as altered by the presence, absence or movement of the material at the level of the first guide means;

the microwave bridge circuit means receiving the reflected measurement and reference waves and producing a differentiation signal indicative of a difference in magnitude and phase between the waves;

detector means for generating an output indicative of the magnitude of the differentiation signal; and comparator means for comparing the magnitude of the detector means output to a preselected signal magnitude and for providing an actuation signal indicative of the presence, absence or movement of the material at the level of the first guide means.

2. The sensor as defined in claim 1, wherein the reference wave altering means comprises:

a sample chamber containing a quantity of the material in the container and positioned at an end of the second guide means, the reflected reference microwave being indicative of the reflection coefficient at the boundary layer of the sample chamber.

3. The sensor as defined in claim 1, wherein the reference wave altering means comprises:

a resistive tuning means adjustably positionable with respect to the second guide means for selectively altering the magnitude of the reflected reference wave to equal the magnitude of the reflected measurement wave; and two or more reactive tuning elements adjustably positionable with respect to the second guide means for selectively altering the phase of the reflected reference wave to equal the phase of the reflected measurement wave.

4. The sensor as defined in claim 3, wherein the output of the detector means is a DC signal whose magnitude is proportional to the magnitude of the difference in amplitude and phase between the reflected measurement and reference waves.

5. The sensor as defined in claim 1, wherein the transparent portion of the container is a dielectric tank wall.

6. The sensor as defined in claim 1, wherein the axis of the first and second guide means are aligned, and the second guide means transmits the reference wave to the reference wave altering means in a direction opposite the transparent portion of the container.

7. The sensor as defined in claim 1, further comprising:

amplifying means for increasing the magnitude of the output from the detector means; and amplifying adjustment means for selectively adjusting the gain of the amplifying means.

8. The sensor as defined in claim 1, further comprising:

time delay means for receiving the actuation signal and outputting a control signal when the actuation signal is maintained for at least a selected time period.

9. The sensor as defined in claim 1, wherein the interior cross-section of the first guide means is substantially identical to the interior cross-section of the second guide means.

10. The sensor as defined in claim 1, wherein the microwave bridge circuit outputs the differential signal in a direction substantially normal to the axis of the first guide means.

11. A sensor for detecting the movement characteristics of material in a container, comprising:

microwave oscillator means for generating a constant propagated microwave in a frequency range of from 1 to 20 gigahertz;

microwave bridge circuit means for dividing the propagated microwave into a measurement microwave and a reference microwave;

first guide means for injecting the measurement microwave through a portion of the container substantially transparent to the propagated microwave frequency and for returning a reflected measurement microwave to the microwave bridge circuit means indicative of the reflection coefficient at the boundary layer of the transparent portion, the coefficient being significantly altered by the presence compared to the absence of the material at the level of the first guide means;

second guide means for transmitting the reference wave from the microwave bridge circuit means and for returning a reflected reference wave to the microwave bridge circuit means;

reference wave altering means for altering the reflected reference wave to correspond to the reflected measurement microwave as altered by the presence or absence of the material at the level of the first guide means;

the microwave bridge circuit means receiving the reflected measurement and reference waves and producing a differentiation signal indicative of a difference between the waves;

detector means for generating an output indicative of the magnitude of the differentiation signal; and comparator means for comparing the magnitude of the detector means output to a preselected signal magnitude and for providing an actuation signal indicative of the presence or absence of the material at the level of the first guide means.

12. The sensor as defined in claim 11, wherein the reference wave altering means alters the amplitude and phase of the reflected reference microwave to correspond to the amplitude and phase of the reflected measurement microwave.

13. The sensor as defined in claim 12, wherein the output of the detector means is a DC signal whose magnitude is proportional to the magnitude of the difference in amplitude and phase between the reflected measurement and reference waves.

14. The sensor as defined in claim 11, wherein the reference wave altering means comprises:

a resistive tuning means adjustably positionable with respect to the second guide means for selectively altering the magnitude of the reflected reference wave to equal the magnitude of the reflected measurement wave; and two or more reactive tuning elements adjustably positionable with respect to the second guide means for selectively altering the phase of the reflected reference wave to equal the phase of the reflected reference measurement wave.

15. The sensor as defined in claim 11, further comprising:

amplifying means for increasing the magnitude of the output from the detector means;

amplifying adjustment means for selectively adjusting the gain of the amplifying means; and time delay means for receiving the actuation signal and outputting a control signal when the actuation signal is maintained for at least a selected time period.

16. A method for detecting the movement characteristics of material in a conduit or container, comprising:

generating a constant propagated microwave in a frequency range of from 1 to 20 gigahertz;

separating the propagating microwave into a measurement microwave and a reference microwave;

injecting the measurement microwave through a portion of the container substantially transparent to the propagated microwave frequency and returning a reflected measurement microwave indicative of the reflection coefficient at the boundary layer of the transparent portion, the coefficient being significantly altered by the presence compared to the absence of the material at the boundary layer;

transmitting the reference wave and returning a reflected reference wave;

selectively altering the reflected reference wave to correspond to the reflected measurement microwave as altered by the presence or absence of the material at the boundary layer;

receiving the reflected measurement and reference waves and outputting a differentiation signal indicative of a difference between the waves;

generating an output indicative of the magnitude of the differentiation signal; and comparing the magnitude of the output to a preselected magnitude and providing an actuation signal indicative of the presence or absence of the material of the level at the boundary layer.

17. The method as defined in claim 16, wherein the amplitude and phase of the reflected reference microwave is selectively tuned to the amplitude and phase of reflected measurement microwave.

18. The method as defined in claim 17, wherein the output indicative of the magnitude of the differential signal is a DC output proportional to the difference in amplitude and phase between the reflected measurement and reference waves.

19. The method as defined in claim 16, wherein the step of selectively altering the reflected reference wave comprises subjecting the reference wave to the same material as the material in the container.

20. The method as defined in claim 16, wherein the step of selectively altering the reflected reference wave comprises:

adjustably positioning a tuning element to selectively alter the magnitude of the reflected reference wave to equal the magnitude of the reflected measurement wave; and adjustably positioning another tuning element to selectively alter the phase of the reflected reference wave to equal the phase of the reflected measurement wave.

21. A method for detecting the movement characteristics of material in a conduit or container, comprising:

(a) generating a wave having a frequency from 1 to 20 gigahertz;

(b) separating the wave into a measurement wave and a standard wave;

(c) transmitting and injecting the measurement wave into the container for impacting the available material and for returning a reflected measurement wave indicative of the reflection coefficient at the point of impact, the characteristics of the reflection coefficient being altered by the movement characteristics of the material;

(d) transmitting and altering the standard wave for producing a reflected standard wave having an amplitude and phase corresponding to an amplitude and phase associated with the measurement wave;

(e) combining the reflected measurement wave with the reflected standard wave for either constructively enhancing or destructively reducing the combined waveform for generating a combined wave;

(f) analyzing the combined wave to determine the presence of, absence of, or motion of the material in the container, and (g) generating an actuation signal indicative of the presence of, absence of, or motion of the material in the container.

22. The method as defined in claim 21 wherein the step of transmitting and altering the standard wave comprises altering the standard wave with tuning elements for producing a reflected standard wave having an amplitude and phase equal to the amplitude and phase of the reflected measurement wave when impacting the material whose presence or absence is sought to be determined.

23. The method as defined in claim 21 wherein the step of analyzing the combined wave comprises:

(a) generating a first output by differentiating between the magnitude of the combined wave and a comparator threshold such that the comparator output is either low or high indicating the magnitude of the combined wave is either below or above the comparator threshold, respectively, and (a) generating a second output from the first output for activating a relay which drives lights, alarms, pumps and the like by ramping down a low first output and by ramping up a high first output whereby extraneous portions of the first output caused by splashing, sloshing and the like are selectively purged from the resultant second output.

24. The method as defined in claim 21 wherein the step of analyzing the combined wave comprises:

(a) generating a bipolar signal, from the combined wave by taking the difference between a present instantaneous sample of the combined wave and a delayed instantaneous sample of the combined wave whereby no change in the amplitude of the instantaneous samples creates a zero bipolar signal; and (b) generating a unipolar signal from the bipolar signal whereby the magnitude of the unipolar signal is equal to the absolute value of the bipolar signal.

25. The method as defined in claim 24 further comprising the step of amplifying the combined wave for enhancing changes caused by the reflection coefficient.

26. The method as defined in claim 24 wherein the step of generating a unipolar signal comprises:

(a) generating a dense unipolar signal, and (b) generating a sparse unipolar signal whereby the dense unipolar signal indicates a dynamic flow condition, the sparse unipolar signal indicates intermittent flow conditions, and the absence of any unipolar signal indicates the absence of flow.

27. A sensor for detecting the movement characteristics of material in a container or conduit, comprising:

(a) an oscillator for generating a constant propagated microwave in a frequency range of from 1 to 20 gigahertz;

(b) a bridge for dividing the microwave into a measurement microwave, a reference microwave and a combined microwave, said bridge comprising:

(1) a medial waveguide for accepting the microwave from said oscillator and for egressing the measurement microwave and the reference microwave, (2) a measurement waveguide, for accepting the measurement microwave from said medial waveguide and for impinging the measurement microwave on, for passage through, a portion of the container substantially pellucid to the microwave frequency and for returning a reflected measurement microwave indicative of the reflection coefficient at the boundary layer of the pellucid portion, the reflection coefficient being significantly altered by the presence, the absence and the movement of the material;

(3) a reference waveguide, for accepting the reference microwave from said medial waveguide and for returning a reflected reference wave;

(4) an interference waveguide for accepting the reflected measurement microwave and the reflected reference microwave for creating a combined reflected microwave characteristic of the interference caused by the combination of the reflected measurement microwave and the reflected reference microwave, (c) a reference wave altering means in operative association with said reference waveguide for modifying the reference wave to correspond in amplitude and phase to the reflected measurement microwave as altered by the presence, absence or movement of the material at the level of the first guide means;

(d) detector means for receiving said combined reflected microwave and for generating an output indicative of said combined reflected microwave; and (e) comparator means for comparing the magnitude of the detector means output to a preselected signal magnitude and for providing an actuation signal indicative of the presence, absence or movement of the material at the level of the first guide means.

28. A sensor for detecting the movement characteristics of material in a container or conduit as defined in claim 27 wherein said measurement waveguide and said reference waveguide are of equal length.

*29. A sensor for detecting movement, and one of presence and absence, of material comprising:*

*(a) an oscillator for generating microwaves;*

*(b) microwave bridge means for dividing the generated microwaves into measurement microwaves which engage the material and reference microwaves which engage a tuning means for controlling the amplitude and phase of the reflected reference microwaves, and for receiving reflected microwaves after engagement with the material and tuning means such that the reflected microwaves combine to form a reflected differential signal, which differential signal is nil or zero if the impedance at the material and tuning means is substantially equal,*

*(c) means for processing the differential signal from said microwave bridge means for determining movement, and one of presence and absence, of material as indicated by a change in the differential signal, said means for processing comprising*

*(1) means for receiving the differential signal from said microwave bridge means;*

*(2) means for comparing the change in the differential signal amplitude with respect to time for generating a difference signal,*

*(3) means for generating an output proportional to variations in the difference signal,*

*(4) means for accepting the proportional output and generating a primary control signal,*

*(5) means responsive to the differential signal, the difference signal, a reference voltage and a drive signal for producing an action signal, and*

*(d) means for accepting the action signal and the primary control signal and for generating the drive signal.*

*30. A method for detecting movement, and one of presence and absence, of material comprising the steps of:*

*(a) generating microwaves;*

*(b) dividing the generated microwaves into measurement microwaves and reference microwaves,*

*(c) reflecting the measurement microwaves from the material and the reference microwaves from a tuning means for controlling the amplitude and phase of the reflected reference microwaves,*

*(d) impressing the reflected measurement microwaves with the reflected reference microwaves to render a differential signal; and*

*(e) processing the differential signal for determining movement, and one of presence and absence, of material indicated by a change in the differential signal, said step of processing the differential signal further comprising the steps of:*

*(1) receiving the differential signal;*

*(2) comparing the change in the differential signal amplitude with respect to time for generating a difference signal,*

*(3) generating an output proportional to variations in the difference signal,*

*(4) generating a primary control signal from the proportional output,*

*(5) generating an action signal responsive to the differential signal, the difference signal, a reference voltage and a drive signal, and*

*(f) generating, from the action signal and the primary control signal, the drive signal representative of movement, and one of presence and absence, of material for controlling other processing equipment in response to the flow condition of the material.*

* * * * *